O. F. IMMELL.
GRAPPLE FOR CATCHING FISH.
APPLICATION FILED MAY 26, 1915.
1,171,440. Patented Feb. 15, 1916.
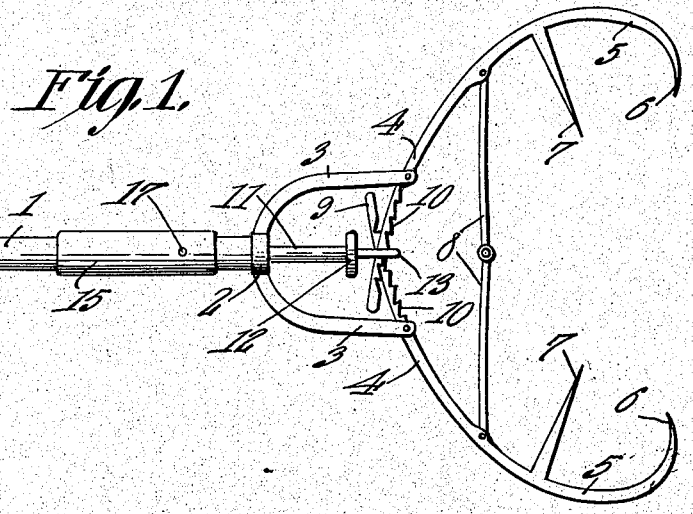
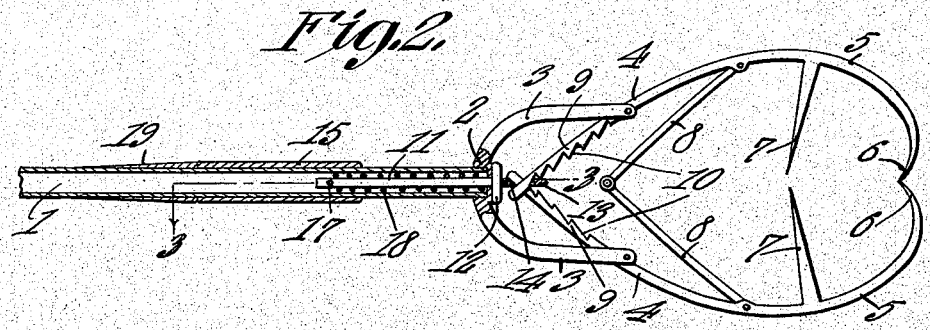
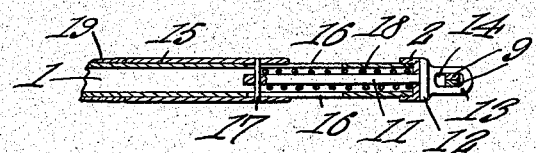
O. F. Immell,
Inventor
Witnesses
by C. A. Snow & Co.
Attorneys

UNITED STATES PATENT OFFICE.

OMER F. IMMELL, OF BLAIR, WISCONSIN.

GRAPPLE FOR CATCHING FISH.

1,171,440.  Specification of Letters Patent.  Patented Feb. 15, 1916.

Application filed May 26, 1915. Serial No. 30,633.

*To all whom it may concern:*

Be it known that I, OMER F. IMMELL, a citizen of the United States, residing at Blair, in the county of Trempealeau and State of Wisconsin, have invented a new and useful Grapple for Catching Fish, of which the following is a specification.

The present invention appertains to fishing tackle, and aims to provide a novel and improved grapple adapted especially for catching fish or other game.

It is the object of the invention to provide a grapple of the nature indicated which is of unique construction and embodies a peculiar assemblage of the component parts, whereby a pair of jaws are held in separated position when the device is set, so that when the device is manipulated to thrust the jaws astride the fish, the jaws will be released and will be automatically swung toward one another for securely catching and holding the fish, the device being readily reset manually, but not being liable to be operated by the fish in its attempt to get away.

It is also within the scope of the invention to improve the device generally in its construction and details, to enhance the utility thereof, and at the same time, to provide a fishing tackle which is comparatively simple and inexpensive in construction, as well as being convenient, practical, serviceable and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a side elevation of the grapple in set position, a portion of the handle being broken away. Fig. 2 is a view of the grapple in released or closed position, parts being shown in section and parts in full. Fig. 3 is a longitudinal sectional detail taken on the line 3—3 of Fig. 2.

In carrying out the invention, there is provided a tubular handle or staff 1 of suitable length, which has a cap 2 threadedly or otherwise engaged upon one end thereof. This cap 2 carries a fork comprising the arms 3 diverging from diametrically opposite points of the cap 2, and projecting away from the handle 1 at the opposite sides of the axis of the handle.

A pair of grapple levers 4 are pivoted between their ends to the free ends of the arms 3, and those long arms 5 of the levers 4 which project away from the handle 1 are curved to provide jaws having the inwardly curved spurs or prongs 6 at their free ends. The arms or jaws 5 also have the inwardly projecting spurs or prongs 7 adjacent the prongs 6.

As a means for normally holding the jaws 5 separated, and for automatically releasing said jaws when they are thrust astride the fish, a prop comprising a pair of sections 8 is carried by the jaws 5. The adjacent ends of the prop sections 8 are pivoted together, and the remote ends of said prop sections are pivoted to the jaws 5 between the prongs 7 and pivots or fulcrums of the levers 4, the prop being arranged adjacent the fork arms 3. When the prop is straightened out, it will hold the jaws 5 separated, as seen in Fig. 1, and when an object strikes the prop 8 it will cause the prop to "break", as seen in Fig. 2, to allow the jaws 5 to swing toward one another to closed position. When the prop breaks, the intermediate portion thereof moves toward the handle between the arms 3.

The levers 4 have the short crossed arms 9 projecting between the arms 3 of the fork, and those edges of the arms 9 remote from the handle 1 are provided with ratchet teeth 10 whose shoulders face toward the free ends of the arms 9.

A plunger rod 11 is slidable through the cap 2 and enters the handle 1, and the outer end of the rod 11 is provided with a head 12 to seat against the cap 2, as seen in Fig. 2, and the head 12 is provided with an outstanding tongue or portion 13 having a longitudinal slot 14 through which the arms 9 project side by side. A sleeve 15 is slidable upon the handle 1 adjacent the cap 2, and the handle 1 is provided with diametrically opposite longitudinal slots 16 adjacent the cap 2. A diametrical pin 17 is similarly engaged to the sleeve 15 and passes through the slots 16, and the intermediate portion of the pin 17 is engaged through the inner end of the rod 11, whereby the rod 11 and sleeve 15 will move together. A coiled wire expansion spring 18 is disposed within the handle 1 around the rod 11 between the cap 2 and pin 17 and normally tends to move the rod 11 into the handle for swinging the jaws 5 together.

In use, to set the grapple, as seen in Fig. 1, the sleeve 15 is moved outwardly along the handle 1 by the hand of the operator, so that the rod 11 will be moved outwardly therewith. The arms 9 of the levers 4 will therefore be swung outwardly, so as to separate the jaws 5, until the prop 8 straightens out. The prop will therefore hold the jaws 5 separated, against the tension of the spring 18 which tends to swing the jaws together. The handle 1 may now be manipulated for projecting the grapple head astride the fish or object to be caught, and when the jaws 5 pass astride the fish or object, the fish will strike the prop and cause the prop to break or double, and this will bring the spring 18 into play for automatically swinging the jaws 5 toward one another for catching and holding the fish. Since the prop sections 8 are pushed inwardly, as seen in Fig. 2, the jaws 5 may swing together, and the rod 11 being moved inwardly by the spring 18 will swing the arms 9 inwardly so that the said jaws will swing toward one another. The rod 11 may pull the arms 9 inwardly without interference, since the tongue 13 may readily slide along the ratchet teeth 10, but when the device has been sprung or released, the shoulders of the teeth 10 will engage the tongue 13 to prevent the jaws 5 from being separated, since it is essential for the separation of the jaws, that the arms 9 swing outwardly, and this is prevented by the engagement of the teeth 10 with the tongue 13 of the rod 11. When the rod 11 is moved outwardly to separate the jaws, the slot 14 allows the end portion of the tongue 13 to move away from the teeth 10 so that the jaws may be separated without difficulty when the device is set manually.

A tapered sleeve 19 is preferably secured rigidly upon the handle 1 at the inner end of the sleeve 15 so that the sleeve 15 rests against the sleeve 19 when the jaws are closed, as seen in Fig. 2. The sleeve 19 allows the hand of the operator to be readily slid from the handle 1 over the sleeve 19 onto the sleeve 15 for purpose of setting the trap.

The present device is not only useful for catching fish, but may also be employed to advantage for catching other game, it being noted that the jaws are kept separated until they are thrust astride the object to be caught, in which event the jaws will be automatically released, and swung toward one another to the ends above noted.

The grapple may be used in a much more efficient manner than the ordinary fish spear, and carries out the desired objects in a satisfactory manner.

Having thus described the invention, what is claimed as new is:

1. In a device of the character described, a pair of levers having arms forming jaws and other arms which are crossed, and a slidable member having means engaging said crossed arms for swinging the levers, the crossed arms having ratchet teeth engageable with said member when the jaws are swung toward one another for preventing the jaws from separating.

2. In a device of the character described, a pair of pivoted levers having arms forming jaws and other arms which are crossed, a plunger having a slotted portion receiving the crossed arms, a spring for moving said plunger to swing the jaws toward one another, the crossed arms having ratchet teeth engageable with said slotted portion for holding the jaws together, and a prop embodying a pair of sections having their adjacent ends pivoted together and their remote ends pivoted to the jaws so that when the prop is straightened out it will hold the jaws separated.

3. In a device of the character described, a tubular handle having a fork at one end, levers pivoted to the arms of the fork and having jaws projecting away from the handle and crossed arms projecting within the fork, and a plunger rod slidable within the handle and slidably engaged to said crossed arms for swinging the jaws to and from each other.

4. In a device of the character described, a tubular handle having a fork at one end, levers pivoted to the arms of the fork and having jaws projecting away from the handle and crossed arms projecting within the fork, a plunger rod slidable within the handle and slidably engaged to said crossed arms for swinging the jaws to and from each other, a spring between the plunger rod and handle for moving said rod into the handle, and means for normally holding the jaws separated and adapted to release the jaws when they are thrust astride an object.

5. In a device of the character described, a tubular handle having a fork at one end, levers pivoted to the arms of said fork and having jaws projecting away from the handle and crossed arms projecting within the fork, and a plunger rod slidable within the handle and having a slotted portion receiving said crossed arms, the said arms having ratchet teeth engageable with said slotted portion to prevent the separation of the jaws.

6. In a device of the character described, a tubular handle having a fork at one end, levers pivoted to the arms of the fork and having jaws projecting away from the handle and crossed arms projecting within the fork, a plunger rod slidable within the handle and having a slotted portion receiving said crossed arms, the said arms having ratchet teeth engageable with said slotted portion to prevent the separation of the jaws, a spring between the handle and plunger rod for moving the said rod into the handle, and a prop embodying a pair of sections having their adjacent ends pivoted together and their remote ends pivoted to the jaws so that when the prop is straightened out it will hold the jaws separated.

7. In a device of the character described, a tubular handle, a cap engaged over one end thereof and having a fork, the handle having longitudinal slots adjacent the cap, a pair of levers pivoted to the arms of the fork and having jaws projecting away from the handle and crossed arms projecting within the fork, a plunger rod slidable through said cap and having a slotted portion receiving said crossed arms, said arms having ratchet teeth for engaging said slotted portion to prevent the jaws from separating, a sleeve slidable upon the handle, a pin engaged to the sleeve and plunger rod and working in said slots, and a coiled wire expansion spring within the handle between said pin and cap.

In testimony that I claim the foregoing as my own, I have hereto affixed my signature in the presence of two witnesses.

OMER F. IMMELL.

Witnesses:
 O. B. BORSHEIM,
 I. N. KUNTSON.

Copies of this patent may be obtained for five cents each, by addressing the "Commissioner of Patents, Washington, D. C."